United States Patent Office 2,862,030
Patented Nov. 25, 1958

2,862,030

PREPARATION OF VITAMIN A ALDEHYDE

Howard C. Klein, Brooklyn, N. Y., assignor to Nopco Chemical Company, Harrison, N. J., a corporation of New Jersey No Drawing. Application August 21, 1957
Serial No. 679,518

10 Claims. (Cl. 260—563)

This invention relates to the preparation of vitamin A and more specifically, relates to the preparation of intermediate compounds which can be employed in the preparation of vitamin A.

The synthesis of vitamin A has engaged the attention of the art since the structure of vitamin A was first disclosed by Karrer in 1933. Many routes for the synthesis of vitamin A have been advanced and a considerable body of literature has developed concerning the preparation of vitamin A, vitamin A active materials and vitamin A intermediates. Because of the demand for vitamin A and the market which exists for this compound, efforts are constantly being made to devise new and improved methods, both for the total synthesis of vitamin A and for the preparation of intermediate compounds which can be employed in the production of vitamin A.

For instance, in U. S. patent applications, Serial No. 545,123 of Klein, Beckmann and Schaaf, filed November 4, 1955, now Patent No. 2,819,310, and Serial No. 545,125 of Schaaf, Klein and Kapp, filed November 4, 1955, now Patent No. 2,819,308, methods have been disclosed for the preparation of vitamin A active material by treating either the cis or the trans form of a material having the empirical formula $C_{20}H_{30}O$ and a structural formula

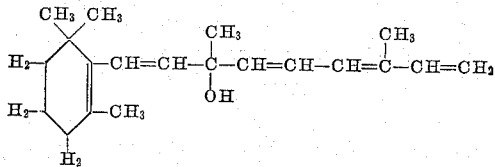

which compound contains the beta ionone ring structure, four ethylenic bonds and one hydroxyl group, and which in the trans configuration has an absorption maximum in the ultra-violet of 2710 A., a molecular extinction coefficient at that wave length of 29,100 and has a refractive index at 20° C. of 1.552 and which in the cis configuration has an absorption maximum in the ultra-violet at 2740 A., a molecular extinction coefficient at that wave length of 25,900 and has a refractive index at 16° C. of 1.535 (referred to hereinafter as Compound I) with a boron trifluoride hexamethylene tetramine complex under appropriate reaction conditions in a water-containing aromatic hydrocarbon solvent solution or in solution in a solvent selected from the group consisting of acetone, acetonitrile, acrylonitrile, benzyl cyanide, dioxane, isopropenyl acetate and tetrahydrofuran. Thereafter, the reaction mixture is worked up with an alkaline material followed by extraction with an appropriate solvent, e. g., hexane, ether, etc. The resulting product which is vitamin A active is referred to hereinafter as Compound IV. Compound IV contains a hexamethylene tetramine fragment in the molecule.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure as vitamin A, only the amine group has replaced the hydroxyl group of vitamin A. The 9.6% figure is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicate that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet region of the spectrum at 3250 A. and has at that wave length an extinction coefficient $$(E_{1\,cm.}^{1\%})$$

of about 1000. If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by treatment with hydrobromic acid and phosphoric acid since treatment of the products with alkali gives in each case the original Compound IV. Acetylation of Compound IV with acetic anhydride gives a product which when analyzed by infrared analysis shows the presence of an amide band in the infrared spectrographic curve.

Compound IV can be converted to vitamin A amine by treating it with aluminum isopropoxide in accordance with the procedure disclosed and claimed in U. S. patent application Serial No. 545,124, Klein, filed November 4, 1955, now Patent No. 2,819,309. Also Compound IV can be converted into vitamin A aldehyde by treating it with iodine in accordance with the procedure disclosed and claimed in U. S. patent application, Serial No. 545,122, Klein and Grassetti, filed November 4, 1955, now Patent No. 2,819,311.

However, Compound IV has some disadvantages regarding its use as a starting material for producing vitamin A aldehyde by treatment with iodine. For instance, to obtain Compound IV, the reaction mixture obtained from the reaction between Compound I and boron trifluoride hexamethylene tetramine complex must be worked up by treatment with an alkaline material, e. g., sodium hydroxide, ammonia, ethanolamine, etc., in order to react with all of the boron trifluoride present in the reaction mixture. Thereafter Compound IV is recovered from the reaction mixture by extraction with a solvent followed by evaporation to remove the solvent. The extraction step for recovering the worked up reaction product involves the use of solvents which are both hazardous and expensive thereby requiring safety precautions as well as recovery operations. The evaporation step involves careful control owing to the sensitivity of Compound IV to heat and oxidation.

Accordingly, it is an object of the present invention to provide an improved method for the synthesis of vitamin A.

It is a more particular object of this invention to provide a novel and effective method for the production of valuable intermediates useful in the production of vitamin A.

A further object is the preparation of vitamin A aldehyde in a more direct and convenient manner than has heretofore been accomplished.

A specific object is the preparation of vitamin A aldehyde in increased yields from Compound I and free from the presence of anhydro vitamin A.

Further objects will become apparent from the detailed description given hereinafter. It is intended, however, that the detailed description and the specific examples do not limit the invention but merely indicate the preferred embodiments of the invention since various changes and modifications within the scope thereof will become apparent to those skilled in the art.

It has been discovered that the above and other objects can be achieved by treating with iodine, preferably in the presence of water, the reaction product of Compound I and boron trifluoride hexamethylene tetramine complex. Preferably the reaction product need not be isolated, but may be treated with iodine in situ in its reaction mixture. In this manner, the hitherto essential steps of working up the reaction product with alkaline materials in order to obtain Compound IV, as well as its subsequent recovery are eliminated, thereby obtaining anhydro free vitamin A aldehyde.

The reaction product of boron trifluoride hexamethylene tetramine complex and Compound I may be obtained in a manner similar to the procedures described in U. S. patent applications Serial No. 545,123 and Serial No. 545,125, referred to above. The cis or the trans form of Compound I may be reacted with the aforesaid boron trifluoride hexamethylene tetramine complex in a water-containing aromatic hydrocarbon solution, such as benzene, toluene, xylene, methyl isopropyl benzene, isopropyl benzene, ethyl benzene, diethyl benzene, mesitylene, butyl benzene, amyl benzene. Similar aromatic hydrocarbon solvents are highly suitably as the reaction medium. These hydrocarbon solvents are substantially water-immiscible but they will dissolve a small percentage of water. Also acrylonitrile, benzyl cyanide, isopropenyl acetate and tetrahydrofuran may be used. When this reaction product, without isolating it from its reaction mixture, is to be subsequently treated with iodine, preferably in the presence of water to effect its conversion to vitamin A aldehyde, it is highly preferable to select a solvent that will form a homogeneous system. Examples of suitable solvents are acetone, acetonitrile, dioxane, and mixtures of such solvents. The preferred solvent is dioxane containing a small amount of water.

The hexamethylene tetramine complex of boron trifluoride which is employed is one in which the ratio of boron trifluoride to hexamethylene tetramine varies from an average of about 1.5 to an average of about 2.5 molecules of boron trifluoride for each molecule of hexamethylene tetramine. Complexes containing larger or smaller ratios of boron trifluoride are not nearly as satisfactory for use in our process as complexes containing these preferred ratios. Preferably a complex containing an average of about 2 molecules of boron trifluoride for each molecule of hexamethylene tetramine is employed. In the reaction the boron trifluoride complex does not act in the normal catalytic sense. In order to obtain the most satisfactory results when using a complex containing about 2 molecules of boron trifluoride for each molecule of hexamethylene tetramine, it is necessary that the boron trifluoride hexamethylene tetramine complex be employed in at least about a mole to mole ratio in proportion to the amount of Compound I which is used in the reaction. Although ratios of less than one to one will produce some product, by far the best results are obtained when at least about a one to one ratio is employed. Molar ratios greater than one to one can be used and are preferred, e. g., two moles of boron trifluoride tetramine complex to one mole of Compound I. When the ratio of boron trifluoride to hexamethylene tetramine in the complex is decreased, the mole ratio of the complex to Compound I is preferably increased a corresponding amount. Also when the ratio of boron trifluoride to hexamethylene tetramine in the complex is increased, the mole ratio of the complex to Compound I can be correspondingly decreased, if desired, although it is not necessary to do so.

It is preferred that the reaction be carried out in an inert atmosphere such as an atmosphere of nitrogen, helium or some other inert gas.

The temperature at which the reaction is carried out can be varied. Preferably, however, the temperature should be between about room temperature and about 35° C.; however, if desired, either lower or higher temperatures can be employed. We have found that at room temperature the reaction will normally proceed to completion in not more than about three hours and in many instances will proceed to completion in from fifteen to thirty minutes.

As pointed out above, the preferred solvent is dioxane containing a small amount of water. Since water forms a complex with boron trifluoride, it might be thought that the presence of water in the reaction mixture would inactivate the boron trifluoride hexamethylene tetramine complex. However, water does not inactivate the boron trifluoride hexamethylene complex. Preferably when dioxane is the solvent, water is added to the reaction mixture to increase the polarity of the solvent since the reaction appears to proceed more efficiently in a highly polar solvent. Thus, from about 1% to 10% of water based upon the volume of the dioxane is preferably employed. Also, if desired, water can be used in the reaction medium when solvents other than dioxane are employed.

Preferably rather dilute solutions of Compound I are employed in carrying out the reaction of Compound I and boron trifluoride hexamethylene tetramine complex. In most cases a concentration of from 0.1 gram to about 1.0 gram of Compound I is present for each 100 ml. of total solution.

The resulting product which is a new complex produced by interaction of Compound I and boron trifluoride hexamethylene tetramine complex as described in U. S. patent application Serial No. 679,519 of Grassetti filed concurrently herewith has been isolated and is a practically colorless solid, tends to decompose and has a sintering point at about 145° C. It has a λ max=3300 A. and an $$E_{1\ cm.}^{1\%} = 1010$$

If instead of isolating this product, it is worked up by treatment with an alkaline material as described in U. S. patent application Serial No. 545,123, Klein, Beckmann and Schaaf filed November 4, 1955, or Serial No. 545,125, Schaaf, Klein and Kapp filed November 4, 1955, Compound IV is obtained. However, the reaction product which is employed herein and which is described in the Grassetti application referred to above, is fundamentally different from Compound IV. In other words, it is not merely a complex of Compound IV plus boron trifluoride. This is borne out by the fact that one cannot extrapolate the nitrogen content of the novel complex herein from the nitrogen content of Compound IV. If Compound IV is treated with boron trifluoride, the aforementioned reaction product will not be obtained. Also, if Compound IV is refluxed with water, no appreciable amount of vitamin A aldehyde is obtained whereas the Grassetti application describes a process for obtaining vitamin A aldehyde by refluxing the above product with water.

The following describes my novel procedure for obtaining vitamin A aldehyde by treatment of the reaction product of Compound I and boron trifluoride hexamethylene tetramine complex with iodine. To this reaction product there is added from 5% to 35% by weight of iodine based on the weight of Compound I. The preferred ratio is from 20% to 25% by weight of iodine based on the weight of Compound I. The iodine can be added to the reaction product of Compound I and boron trifluoride hexamethylene tetramine complex which has previously been isolated from its reaction mixture, e. g., by filtration of the spontaneously precipitated reaction product complex or by adding excess hexamethylene tetramine to the reaction mixture and evaporating to dryness. It has been found that the product is stabilized by the presence of excess hexamethylene tetramine. The isolated product may be dissolved in solvents such as those previously disclosed for carrying out the reaction between Compound I and the boron trifluoride hexamethylene tetramine complex. Preferably the iodine is added to the reaction product which has not been isolated but which remains in situ in its own reaction mixture, this reaction mixture serving as a solvent. If the reaction of Compound I and boron trifluoride hexamethylene tetramine is carried out in a water containing a solvent, additional amounts of water may or may not be added to the reaction mixture on completion of the reaction before iodine is added. On the other hand, if no water is present in the reaction mixture which contains the reaction product of Compound I and boron trifluoride hexamethylene tetramine complex, or if this reaction product is isolated and is to be treated with iodine in a water free solvent, then water should be added so that the Schiff base (imine) which is formed as a result of the action of iodine, is hydrolyzed to the aldehyde. Generally, this amount of water is about 15 to 25 ml. per 100 ml. of total reaction volume.

When carrying out the reaction with iodine, the reaction mixture is heated, preferably at the reflux temperature of this mixture containing, of course, the iodine, although a temperature range from 65° C. up to reflux temperature may be used. However, even upon standing at room temperature for several days, some aldehyde is obtained although accompanied by relatively large amounts of polymeric material. Only a short time is necessary for heating, usually from about fifteen minutes to one-half hour has been found to be ample to bring about the formation of vitamin A aldehyde.

Excess iodine is then eliminated from the reaction mixture by adding sodium thiosulfate thereto in an amount sufficient to remove all of the iodine color. The vitamin A aldehyde is then readily recovered from the reaction mixture by any desired means. Extraction with a water-immiscible solvent such as hexane is preferred. This solvent is in turn removed by evaporation. In all cases a very excellent yield of vitamin A aldehyde free of anhydro vitamin A is obtained. Thus the present invention is a further unexpected improvement over the aforementioned Grassetti application wherein subsequent treatment to remove anhydro vitamin A is required.

For a fuller understanding of the nature and objects of the invention, reference may be had to the following examples which are given merely for purposes of illustration and are not to be construed in a limiting sense:

*Example I*

120 mg. of the trans isomer of Compound I were dissolved in 12.5 ml. of dioxane and the resulting solution added to a solution of 229 mg. of a boron trifluoride hexamethylene tetramine complex containing 2 molecules of boron trifluoride for each molecule of hexamethylene tetramine dissolved in 1.25 ml. of water. The reaction mixture was allowed to stand for half an hour at room temperature and then 3.35 ml. of water were added thereto. Then 20 mg. of iodine were incorporated in the reaction mixture and the reaction mixture refluxed for half an hour on a steam bath. The reaction mixture was then cooled under nitrogen and the iodine color was discharged from the reaction mixture using a 10% aqueous solution of sodium thiosulfate. 50 ml. of hexane were added to the reaction mixture and the product extracted into the hexane phase. The excess sodium thiosulfate and the dioxane were removed from the reaction mixture by washing with water. The hexane solution was then dried over sodium sulfate and thereafter the hexane was evaporated to recover the vitamin A aldehyde which was obtained in a net yield of 70%. Ultra-violet spectographic analysis showed that the vitamin A aldehyde was free of anhydro vitamin A and that it had a maximum at 3700 A.

The dioxane used in this example was pre-treated to hydrolyze any glycol acetal that was present therein and to eliminate the acetaldehyde that is formed during such hydrolysis before drying. The procedure employed was that described in Experiments in Organic Chemistry, Fieser, 2nd edition, copyright 1941, D. C. Heath & Co., page 369.

*Example II*

0.240 gram of the trans isomer of Compound I was dissolved in 25 ml. of dioxane. This dioxane was distilled before use. Thereafter, the solution of dioxane containing Compound I dissolved therein was added to a solution containing 0.458 gram of boron trifluoride hexamethylene tetramine complex containing 2 molecules of boron trifluoride for each molecule of hexamethylene tetramine dissolved in 2.5 ml. of water. This addition was made at room temperature. Thereafter, the resulting mixture was allowed to stand for half an hour at room temperature. Then 6.7 ml. of water was added.

To one portion, equal to one-half of the above solution, 40 mg. of iodine were added and the solution refluxed for half an hour. Thereafter, it was treated with hexane and a 10% aqueous solution of sodium thiosulfate in order to remove the iodine present. Recovery of the product from the hexane extracts, gave upon analysis, a smooth, continuous vitamin A aldehyde curve with λ max=3700 A. This spectographic curve also indicated that the vitamin A aldehyde was free from anhydro vitamin A. The net yield was 60.3%. If desired, further purification can be effected, e. g., by chromatography. Such was done in this procedure over water deactivated alumina and a new λ max=3800 A. was obtained.

To the remaining portion of the solution, 5 ml. of dioxane was added and the solution then refluxed for one-half hour. Thereafter, the reaction product was extracted with hexane. A vitamin A aldehyde yield of 57.5% was obtained. However, it was contaminated with anhydro vitamin A to an amount of between 10 and 15%. Upon ultra-violet analysis, a broader ultra-violet curve, indicative of greater amounts of polymer formation, was observed as compared with the curve obtained from the first portion which was treated with iodine. Thus the yield of 57.5% vitamin A aldehyde obtained from this second portion must be corrected for the presence of anhydro vitamin A.

As all of the reactants and products obtained herein are susceptible to air oxidation, it is desirable to carry out all of the foregoing procedures in the presence of an inert atmosphere such as nitrogen, helium, etc.

Vitamin A aldehyde which is obtained by the present invention may be converted to vitamin A by reduction with lithium aluminum hydride as described by Wendler et al. in J. Am. Chem. Soc. 72, 239 (1950).

As indicated by the foregoing, a novel process for obtaining vitamin A aldehyde has been described. The product is obtained in high yields and free from anhydro vitamin A, an undesirable material having no vitamin A activity. This absence of anhydro is extremely surprising because Compound I contains an estimated 7 to 10% of anhydro vitamin A. Hence, this process is highly advantageous because it avoids costly and tedious chromatographic procedures for the removal of anhydro vitamin U. S. patent application Serial No. 679,519 of Grassetti filed concurrently herewith in order to obtain the vitamin A aldehyde in a highly pure form.

Moreover, if one desires to reduce vitamin A aldehyde containing anhydro vitamin A to vitamin A alcohol with, e. g., lithium aluminum hydride and thereafter separate the anhydro by chromatography, inevitable losses of vitamin A alcohol result since more often than not some of the vitamin A alcohol is transformed to anhydro vitamin A by the action of the adsorbent. It is expected that this phenomenon will become more pronounced upon large scale chromatographic operations.

It seems apparent that the iodine is exhibiting selectivity in eliminating the anhydro and yet at the same time having no deleterious effect on the desired vitamin A aldehyde. The present process is an extremely advantageous one, not only because of the fact that a purer product in high yields is obtained, but because it employs a more economical procedure. The reaction product of Compound I and boron trifluoride hexamethylene tetramine complex may be treated with iodine without being isolated from its reaction mixture. This procedure eliminates the usually necessary steps of working up the reaction product with alkaline materials and subsequent separation and purification of the reaction product as done in the case of Compound IV. Thus, economies in time and in manipulative procedures are effected since there is no occasion to employ extra reagents such as alkaline materials and organic solvents. The latter by necessity require safety precautions and in many instances require recovery procedures due to their expense.

It will be appreciated that various modifications can be made in the invention described above and such are within the scope of the present invention as defined in the appended claims.

Having described my invention what I claim is new and desire to secure by Letters Patent is:

1. A process for producing an imine intermediate which when reacted with water yields anhydro free vitamin A aldehyde which comprises reacting with iodine, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

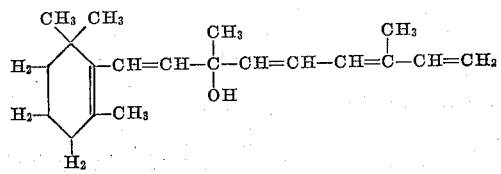

said complex having a λ max=3300 A. and an $$E_{1\,cm.}^{1\%} = 1010$$

2. A process for producing a vitamin A intermediate which comprises reacting with iodine in solution, a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

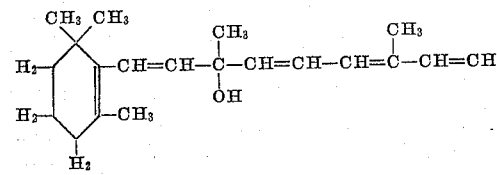

said complex having a λ max=3300 A. and an $$E_{1\,cm.}^{1\%} = 1010$$

3. A process for producing a vitamin A intermediate which comprises reacting in a solvent and at a temperature of between 65° C. and the reflux temperature of the mixture, iodine and a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

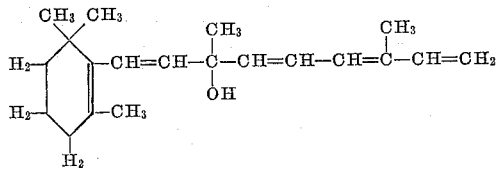

said complex having a λ max=3300 A. and an $$E_{1\,cm.}^{1\%} = 1010$$

said iodine being present in an amount of from 5 to 35% by weight of said

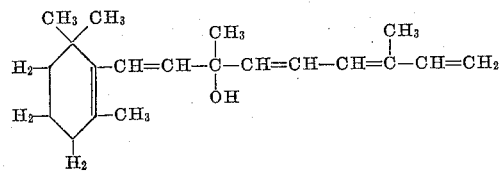

4. The process of claim 3 in which said solvent is selected from the group consisting of water-containing hydrocarbons, acetone, acetonitrile, acrylonitrile, benzyl cyanide, dioxane, isopropenyl acetate, tetrahydrofuran and mixtures thereof.

5. The process of claim 3 in which said iodine is present in an amount of between about 20 and 25%, based on the weight of said

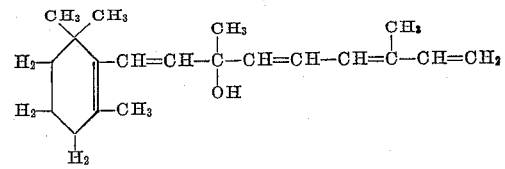

6. A process for producing anhydro free vitamin A aldehyde which comprises reacting in solution at a temperature of between 65° C. and the reflux temperature of the mixture and in the presence of a small amount of water, iodine and a complex obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

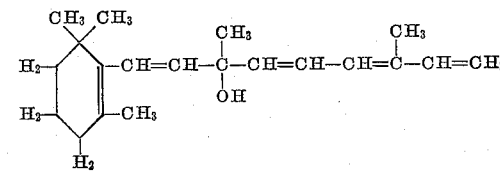

said complex having a λ max=3300 A. and an $$E_{1\,cm.}^{1\%} = 1010$$

said iodine being present in an amount of from 5 to 35% by weight of said

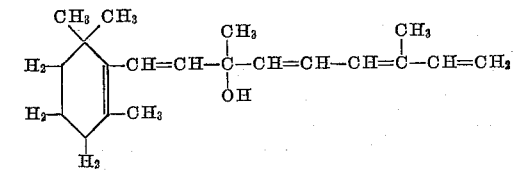

7. A process for producing anhydro free vitamin A aldehyde which comprises adding iodine to a complex in situ in its original reaction mixture which acts as a solvent for said reactants while having present water and heating at a temperature between 65° C. and the reflux temperature of the mixture, said complex being obtained by reacting at least one mole of a boron trifluoride hexamethylene tetramine complex containing from about 1.5 to 2.5 moles of boron trifluoride per mole of hexamethylene tetramine at between room temperature and 35° C. in the presence of a solvent with one mole of

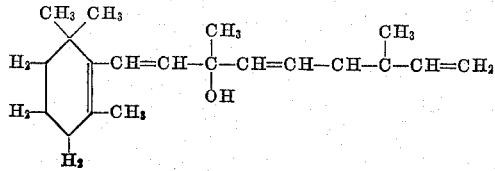

said complex having a λ max=3300 A. and an $$E_{1\,cm.}^{1\%} = 1010$$

said iodine being present in an amount of from 5 to 35% by weight of said

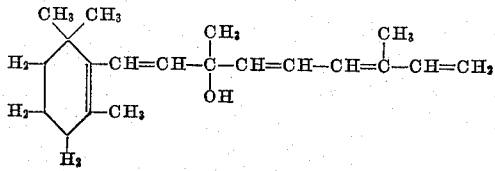

8. The process of claim 7 wherein said solvent comprises dioxane and water.

9. The process of claim 7 in which there is present from about 15 to 25 ml. of water per 100 ml. of total reaction volume.

10. The process of claim 7 in which said iodine is present in an amount of from about 20 and 25% based on the weight of said

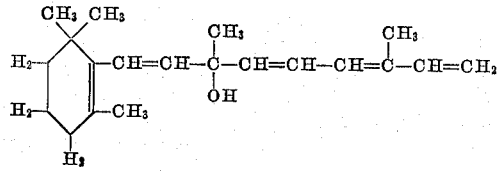

No references cited.